(No Model.)

D. GROVE & B. LILIENFELD.
ROASTING APPARATUS FOR COFFEE, COCOA, &c.

No. 507,538. Patented Oct. 31, 1893.

Witnesses:
Franz Kollm
Alfred Meister

Inventors:
David Grove
Bernhard Lilienfeld
by Edwin A Bryages
their Attorney

UNITED STATES PATENT OFFICE.

DAVID GROVE AND BERNHARD LILIENFELD, OF BERLIN, GERMANY.

ROASTING APPARATUS FOR COFFEE, COCOA, &c.

SPECIFICATION forming part of Letters Patent No. 507,538, dated October 31, 1893.

Application filed May 6, 1892. Serial No. 432,092. (No model.)

*To all whom it may concern:*

Be it known that we, DAVID GROVE, sanitary engineer, and BERNHARD LILIENFELD, merchant, both of the city of Berlin, in the German Empire, have invented new and useful Improvements in Roasting Apparatus for Coffee, Cocoa, and the Like, of which the following is a full, clear, and exact specification.

Our invention relates to improvements in roasting apparatus for coffee, cocoa, and the like the object of the same being to consume the vapors or gases passing off from the material under treatment and also for collecting the husks or light particles of the beans. One of the greatest disadvantages of the roasting apparatus for coffee, cocoa and the like at present in use is, that the gases, which escape with the light particles of the beans, which in the following specification we will term husks, will, whether they remain in the room or pass through the outlet tubes or chimney into the open air, in consequence of the caustic acids contained in the same corrode and destroy the tubes which are also choked by the husk; but even if the damage to the tubes is not taken into consideration the escaping gases have a very deleterious action on all objects with which they come in contact even after having left the chimney.

Now the subject matter of the present invention relates to a device by means of which the husks are collected in special boxes or receptacles and the gases or vapors led the shortest possible way to the grate where the same are consumed. The pungent smell of the vapors which contain tannic acid and which generally penetrate into the workshop and neighborhood is avoided and a roasting process rendered possible without any unpleasant smell.

Figure 1:
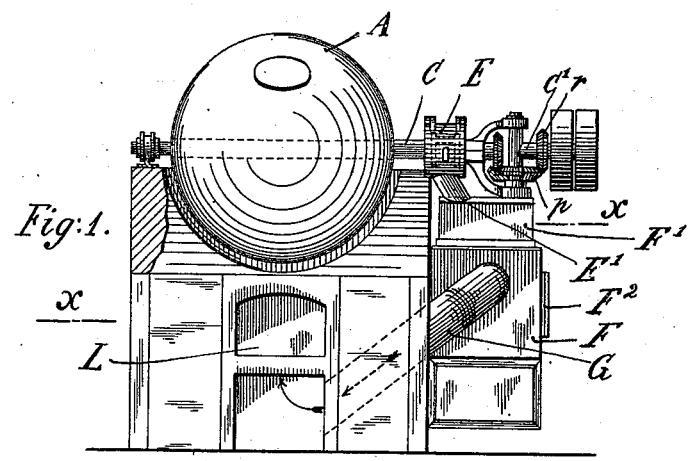
Figure 2:
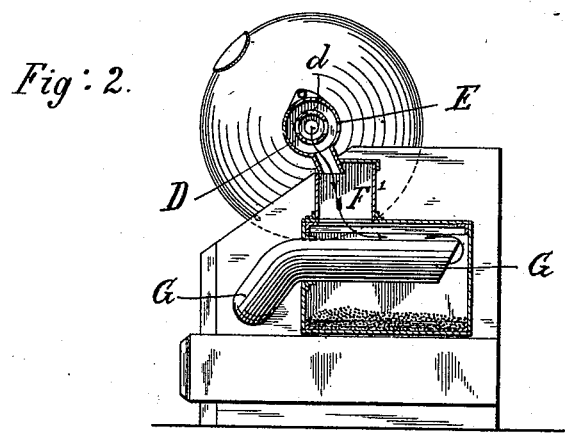
Figure 3:
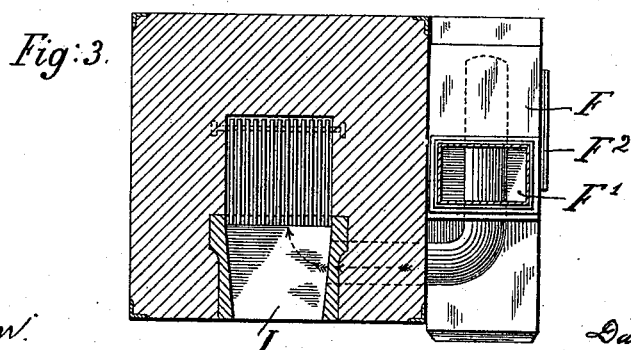

Figure 1 is an elevation; Fig. 2 a side view with the husk collector in section. Fig. 3 is a horizontal section on the broken line $x\,x$ in Fig. 1 of our apparatus.

The apparatus, in so far as it relates to the laterally removable roasting drum A, the hollow shaft C and the driving device, is well known and needs no special description. The standard $c$ carrying the double bevel wheel $p$ also carries a bearing for the strap drum shaft C' and bevel wheel $r$ for bringing the drum into the position for emptying or charging the same.

As will be seen from Fig. 2 one end of the hollow shaft C is extended so as to form a muff or sleeve D with openings $d\,d$ and is surrounded by a casing E. This latter is provided with a tube E' which protrudes into the box or funnel F' to the husk collector F the parts being so connected that when the drum shaft is moved outward in horizontal direction the tube E' will be out of connection with the inlet opening but will become again connected as soon as the parts are moved inward.

The collector F serves to receive the husks passing off through the openings $d\,d$ whereas the tube G serves to lead off the vapors or gases. The tube G is so constructed that it leads the hot vapors or gases immediately beneath the grate where the same become mixed with the air fed to the fuel on the grate thus producing a better utilization of said fuel.

The dampness of the vapors produce a further advantage that the burning of the fire bars is prevented and the durability of the grate increased.

The draft toward the combustion chamber L (Fig. 1) and the chimney (not shown) will suck the vapors or gases from the material under treatment from the drum A, through the openings $d, d$ of the casing E and the collector F into the furnace.

A large portion of the husks will be prevented from passing off with the vapors by means of bars in or the portions left between the openings $d\,d$ so that the same fall through the box or funnel F' laterally of the tube G in the collector F. The position of the inclined inlet to the tube G in the rear upper part of the collector F compels the vapors to follow the way indicated by the arrows in order to prevent the husks being carried with the same. Any vapor arising from the husks in the collector F is also sucked off into the furnace so that the husks are dried and prevented from exercising a corrosive action on the walls of the collector.

The door F² to the collector enables the husks to be removed.

Having now particularly described the said invention and the manner in which the same is to be performed, we declare that what we claim, and wish to secure by Letters Patent, is—

1. A machine for roasting coffee, cocoa, and the like, consisting of a hollow revolving drum with hollow perforated shaft, a stationary casing surrounding said shaft, a husk collector, a tube connecting the casing with the husk collector, and a tube extended into the husk collector for carrying off the gases and vapors, substantially as described.

2. A machine for roasting coffee, cocoa and the like consisting of a hollow revolving drum having a hollow shaft provided with openings, a stationary casing surrounding said shaft, a tube leading from said casing into a funnel, a husk collecting box connected with said funnel and a tube extended into said box and leading to the space below the grate bars for carrying off the gases and vapors, substantially as described.

In witness whereof we have hereunto signed our names in the presence of two subscribing witnesses.

DAVID GROVE.
BERNHARD LILIENFELD.

Witnesses:
L. A. EDWARDS,
EDWIN A. BRYDGES.